United States Patent

Ooenoki et al.

[11] Patent Number: 6,161,408
[45] Date of Patent: Dec. 19, 2000

[54] BENDING METHOD AND BENDING APPARATUS

[75] Inventors: Toshiyuki Ooenoki; Toshiro Ootani, both of Hirakata, Japan

[73] Assignee: Komatsu Ltd., Tokyo, Japan

[21] Appl. No.: 09/147,585

[22] PCT Filed: Aug. 15, 1997

[86] PCT No.: PCT/JP97/02847

§ 371 Date: Jan. 27, 1999

§ 102(e) Date: Jan. 27, 1999

[87] PCT Pub. No.: WO98/08630

PCT Pub. Date: Mar. 5, 1998

[30] Foreign Application Priority Data

Aug. 26, 1996 [JP] Japan ............................... 8-224077

[51] Int. Cl.[7] ........................................................ B21D 5/08
[52] U.S. Cl. ....................... 72/31.01; 72/31.1; 72/31.11; 72/389.3; 72/702
[58] Field of Search ................................. 72/389.3, 702, 72/31.01, 31.1, 31.11

[56] References Cited

U.S. PATENT DOCUMENTS

| 4,430,879 | 2/1984 | Rolland | 72/389.3 |
| 4,864,509 | 9/1989 | Somerville et al. | 72/702 |
| 5,483,750 | 1/1996 | Ooenoki et al. | 72/389.3 |
| 5,839,310 | 11/1998 | Tokai et al. | |

FOREIGN PATENT DOCUMENTS

| 6-262264 | 9/1994 | Japan . |
| 7-265957 | 10/1995 | Japan . |
| 7-314042 | 12/1995 | Japan . |
| WO95/26239 | 10/1995 | WIPO . |

*Primary Examiner*—David Jones
*Attorney, Agent, or Firm*—Arent Fox Kintner Plotkin & Kahn, PLLC

[57] ABSTRACT

A major object of the present invention is to compensate for variations in springback angle resulting from variations in material properties from one lot to the next, for the realization of high angle accuracy bending. Based on the difference between a workpiece actual bend angle detected during bending and an estimated bend angle of a workpiece W at an arbitrary penetration point of an upper die 5, a correction value for prestored data relating to a springback behavior under a processing condition is obtained. Based on the correction value, a final penetration point of the upper die 5 is obtained.

5 Claims, 7 Drawing Sheets

BENDING METHOD AND BENDING APPARATUS

TECHNICAL FIELD

This invention relates to a bending method for bending a sheet-like workpiece between a movable die and a fixed die through the application of pressure and to an associated bending apparatus.

BACKGROUND ART

A common problem with conventional bending apparatus such as press brakes is that when V-bending a sheet-like workpiece by such bending apparatus, the behavior of workpiece plastic deformation varies depending upon the material properties. It is well known in the art that even when the same material is used, the angle of a bend produced in the workpiece is likely to significantly vary from one lot to the next due to the variation in material properties. Because of this, it is extremely difficult to accurately control the amount of penetration of the movable die (punch). Practically, the selection of the punch penetration amount is an artful choice based on trial and error coupled with the experience of the press brake operator.

In order to cope with the forgoing problem, various types of press brakes have been proposed and some of them are now put into practical use, in which a workpiece bend angle is detected during bending and based on the workpiece bend angle thus detected, the amount of punch penetration is controlled. One such example of a press brake is shown in Japanese Patent Publication Kokai Gazette No. 7-265957 (1995). The press brake shown in the patent application No. 7-265957 is based on the fact that the variation in springback angle between material lots is small. Data relating to the springback angle are stratified by workpiece material and by plate thickness for storage. Arithmetic operations are performed on the basis of the stored data to find a final punch penetration amount. An advantage of this prior art control technique is that an estimation of a springback angle can accurately be formed by a single angle detection process without having to perform a complicated control process on the movable die.

Practically, the springback angle varies to some extent because of variations in the material properties between lots (see FIG. 7). FIG. 7 shows springback angles at different bend angles of 6 kinds of cold rolled steel plates. As can be seen from FIG. 7, the springback angle varies within the range of about ±0.3 degree because of the lot-to-lot material property value variation. This results in the requirement that when bending a workpiece at an accuracy of ±0.3 degree or less, a springback angle must be estimated or detected with satisfactory accuracy.

A method for detecting a springback angle has been known in the art. In this detection method, the upper and lower dies are temporarily and relatively moved away from each other for providing a clearance therebetween during bending, to detect a springback angle from the difference between a pre-separation bend angle and a post-separation bend angle. However, this springback detection method is problematic in that when the upper and lower dies are moved towards each other after the separation, the point of contact of each die with the workpiece changes. This results in poor processing accuracy.

The present invention is directed to overcoming the foregoing problem associated with the prior art technique. Accordingly, a major object of the present invention is to provide an improved bending method and its associated bending apparatus. The present invention makes it possible to compensate for springback angle variation caused by variations in material properties from one lot to the next for the realization of very high-accuracy bending.

DISCLOSURE OF THE INVENTION

In the present invention, springback-angle behavior data are stored after stratification by bend condition and correction is made according to the variation in material properties. As a result of such arrangement, it becomes possible to achieve very high-accuracy bending independently of springback-angle variations resulting from material property value variations from one lot to the next.

The present invention provides a bending method for bending a sheet-like workpiece between a movable die and a fixed die by pressing, the bending method comprising the steps of:

(a) finding, based upon the difference between an actual bend angle of the workpiece detected at a temporal penetration point of the movable die during a process of bending the workpiece and an estimated bend angle of the workpiece at an arbitrary penetration point of the movable die, a correction value for data relating to a springback behavior under a prestored processing condition for the bending process; and (b) obtaining, based on the correction value, a final penetration point of the movable die.

For realizing the above bending method, the present invention also provides a bending apparatus for bending a sheet-like workpiece between a movable die and a fixed die by pressing, the bending apparatus comprising:

(a) storage means for storing, for each processing condition of the workpiece, both a relationship existing between the bend angle of the workpiece and the penetration amount of the movable die and a relationship existing between the bend angle of the workpiece and the springback angle of the workpiece;

(b) angle detecting means for detecting a bend angle produced in the workpiece during a process of bending the workpiece;

(c) arithmetic means for arithmetically finding a final penetration point of the movable die from an actual bend angle of the workpiece detected by the angle detecting means at a temporal penetration point of the movable die as well as from an estimated bend angle of the workpiece arithmetically derived from the workpiece bend angle verses movable die penetration amount relationship stored in the storage means; and (d) die driving means for driving the movable die to the final penetration point after driving it to the temporal penetration point.

In the present invention, both a workpiece bend angle verses movable die penetration amount relationship and a workpiece bend angle versus springback angle relationship are prestored in the storage means for each workpiece processing condition. At the time of subjecting a particular workpiece to a bending process, the die driving means operates to drive the movable die to a temporal die penetration point at which the actual angle of a bend produced in the workpiece is detected by the angle detecting means. Thereafter, based on the workpiece actual bend angle thus detected, a workpiece estimated bend angle is arithmetically calculated from the workpiece bend angle verses movable die penetration amount relationship stored in the storage means. These workpiece actual and estimated bend angles are used to arithmetically calculate a final penetration point for the movable die. The movable die is driven to the final penetration point to complete the bending process. Since a final penetration point is arithmetically calculated based on a workpiece estimated bend angle arithmetically calculated at an angle detecting point and on a workpiece actual bend angle, this makes it possible to accurately make an estimation for a springback angle even when there are springback angle variations resulting from material property value variations from one lot to the next. This provides very high-accuracy bending.

In the present invention, the temporal penetration point is arithmetically calculated from the workpiece bend angle verses movable die penetration amount relationship and the workpiece bend angle verses springback angle relationship stored in the storage means.

It is possible for the arithmetic means to perform, based on the difference between the workpiece actual bend angle and the workpiece estimated bend angle, a correctional arithmetic operation for making a correction on the workpiece bend angle verses springback angle relationship to find a correction amount, and to arithmetically calculate the final penetration point of the movable die on the basis of the correction amount.

In such a case, it is preferred that the correctional arithmetic operation is performed by (a) selecting a workpiece bend angle verses movable die penetration amount relationship as a particular one of a plurality of regions within a plane defined by the workpiece bend angle and movable die penetration amount of the above relationship and (b) selecting an expression representative of a workpiece bend angle verses springback angle relationship corresponding to the selected region.

BEST MODE FOR CARRYING OUT THE INVENTION

Modes for embodying a bending method and its associated bending apparatus according to the present invention will be described by reference to the accompanying drawings.

Figure 1:
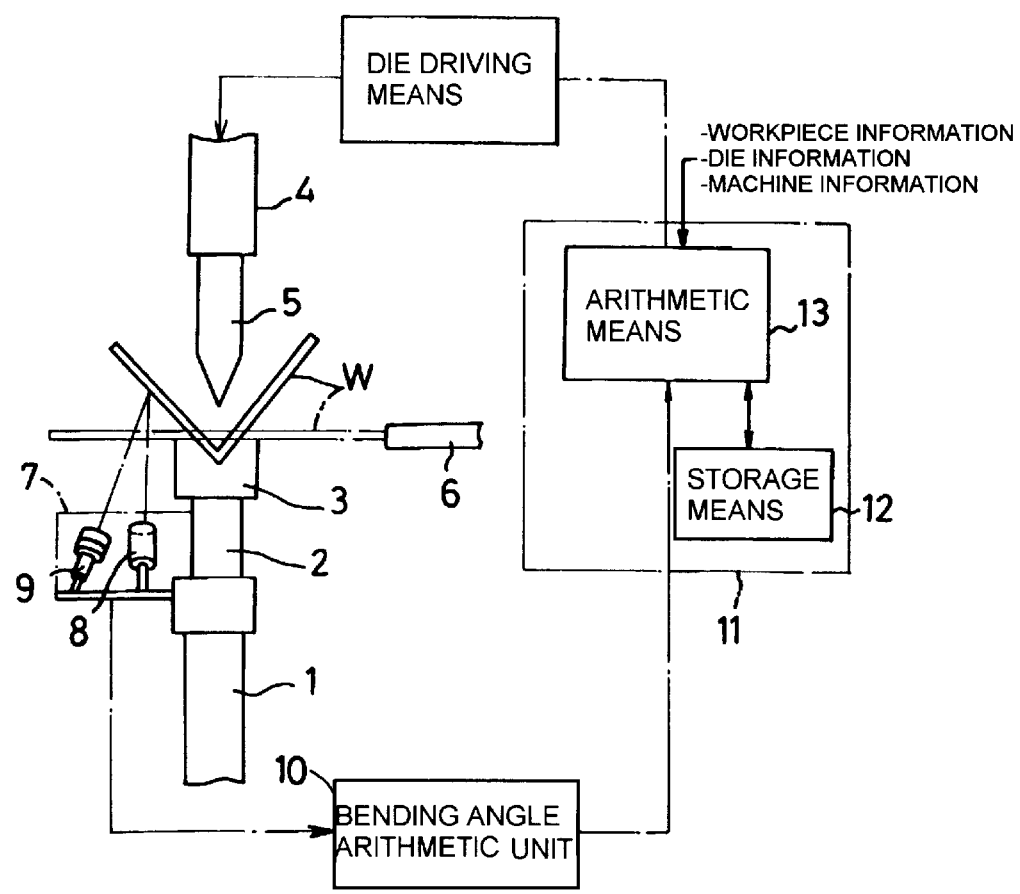
FIG. 1 is a system structure diagram of a bending apparatus in accordance with an embodiment of the present invention.

Referring first to FIG. 1, therein shown is a system structure diagram of a bending apparatus in accordance with an embodiment of the present invention.

The bending apparatus of the present embodiment is implemented by a press brake, in which a die base 2 is fixedly attached onto a fixed table 1. Mounted on the die base 2 is a lower die 3. An upper die 5 is attached to the bottom of a ram 4 in a face to face fashion to the lower die 3. The ram 4 is driven in vertical direction so that the upper die 5 is allowed to approach to and move away from the lower die 3. A sheet-like workpiece W, which is a target for bending, is inserted between the lower die 3 and the upper die 5. The ram 4 is lowered towards the lower die 3, with one end of the workpiece W in contact with a back stop device 6, whereby the workpiece W is pressed between the lower die 3 and the upper die 5 and is bent to a predetermined angle.

Mounted at the front of the fixed table 1 is an angle detector 7 operable to detect, during bending of the workpiece W, the angle of a bend produced in the workpiece W. The angle detector 7 includes a light source 8 for projecting slit light onto an outer surface of the workpiece W and a CCD camera 9 for taking the picture of a linear light-projection image formed on the outer surface of the workpiece W. The image taken in by the CCD camera 9 is subjected to image processing for detecting a bend angle of the workpiece W. If another angle detector 7 is mounted also at the rear of the fixed table 1 in addition to the one mounted at the front thereof, this provides improvement in angle detecting accuracy.

Figure 2:
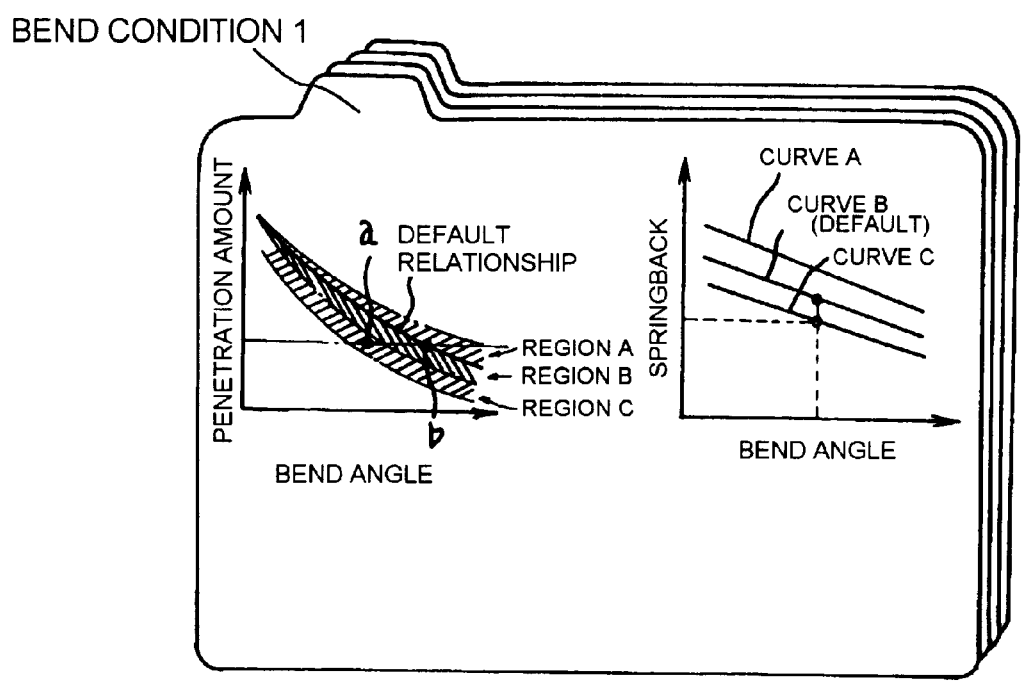
FIG. 2 is a diagram showing an example of data stored in a storage means.

The image taken in by the CCD camera 9 is displayed on a monitor TV screen (not shown in the figure). At the same time, the image is processed as image data in a bend angle arithmetic unit 10. The bend angle arithmetic unit 10 performs arithmetic operations in order to calculate a workpiece bend angle and the result is fed to a NC device 11. The NC device 11 has a storage means 12 and an arithmetic means 13. The storage means 12 is disposed to store, for each bend condition (processing condition) of the workpiece W, (a) the relationship between a springback angle and a workpiece target bend angle and (b) the relationship between a die penetration amount and a workpiece bend angle. Based on the data stored in the storage means 12 as well as on the bend conditions of the workpiece W (such as material, sheet thickness, bend shape, die shape, and machine information), the arithmetic means 13 performs arithmetic operations to calculate a temporal penetration point and a final penetration point for the upper die 5. FIG. 2 shows an example of data stored in the storage means.

Figure 3:
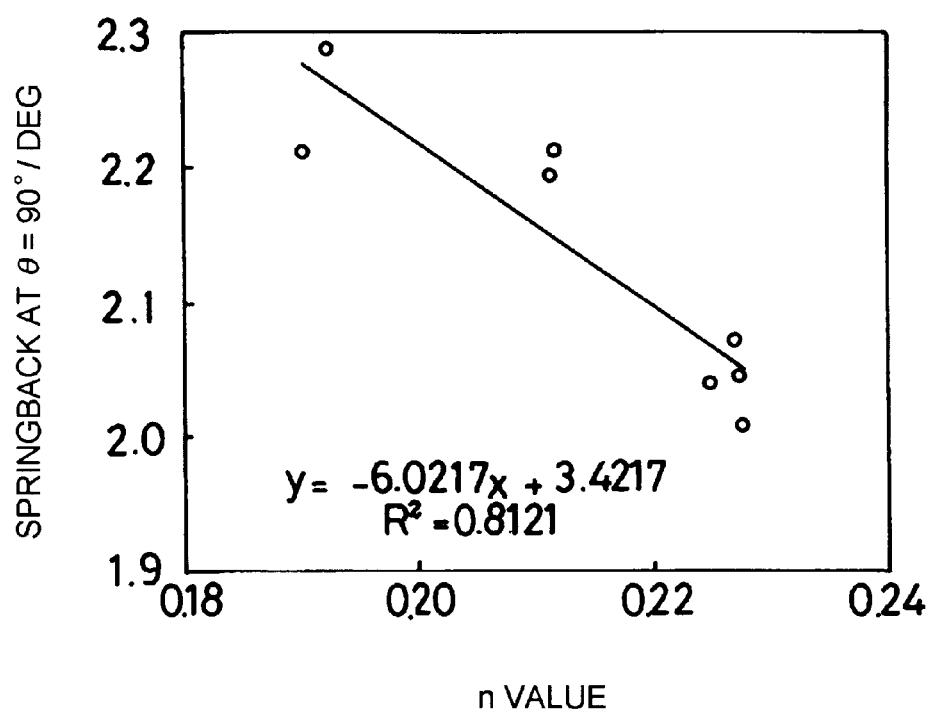
FIG. 3 graphically shows an n value versus springback angle relationship.
Figure 4:
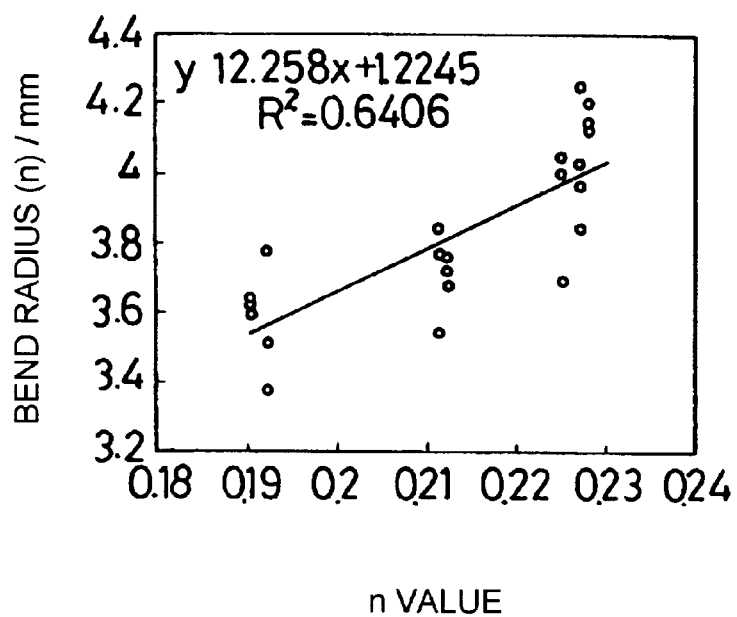
FIG. 4 graphically shows an n value versus material bend radius relationship.
Figure 5:
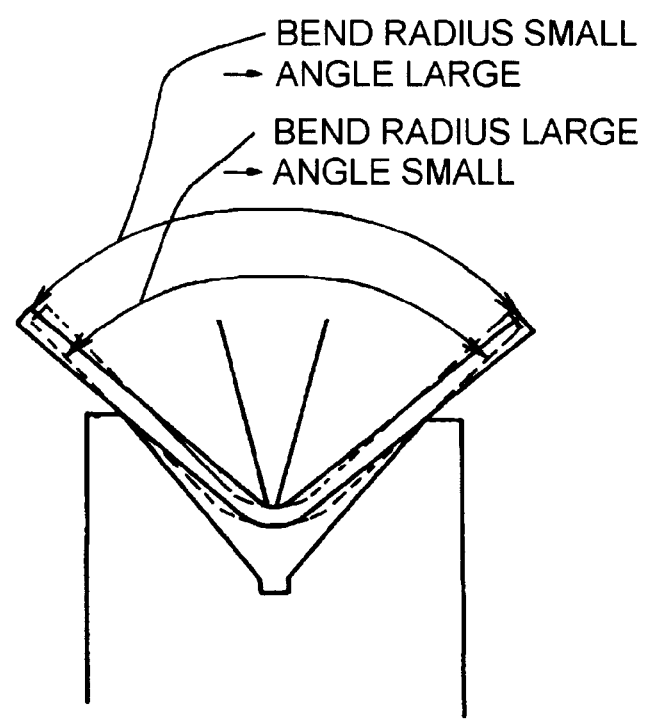
FIG. 5 is a descriptive diagram illustrating the relationship between a bend radius and a bend angle at the same bottom dead center.

The springback angle or elastic return of the sheet-like workpiece W occurring at the time of bending has been considered to correlate to some factors such as material tensile strength, Young's modulus, and work hardening exponent (n value). However, when giving consideration, only to variations in properties from one lot to the next of the same material, it is the n value that can be considered to exert the greatest influence on the springback angle. FIG. 3 graphically shows the result of examining the correlation between the n value and the springback angle in cold rolled steel plates. FIG. 4 graphically shows that there is a high correlation between n value and material bend radius. Additionally, it has been known that if the bend radius of the workpiece W differs, this results in producing variations in the bend angle of the workpiece W at the same bottom dead center (i.e. the penetration point of the upper die), as shown in FIG. 5. Stated another way, if the workpiece W is composed of a material whose bend angle is small at a certain bottom dead center, this causes the workpiece W to have a larger bend radius as well as a greater n value. As a result, such a material is subjected to a large springback angle. Accordingly, it is possible to make an estimation of a springback angle by detecting, at a specified position, a bend angle of the workpiece W. Based on the result of the springback angle estimation, the penetration amount of the upper die 5 acting as a drive die is controlled, whereby bending which provides high dimensional accuracy can be realized irrespective of variations in material properties.

Figure 6:
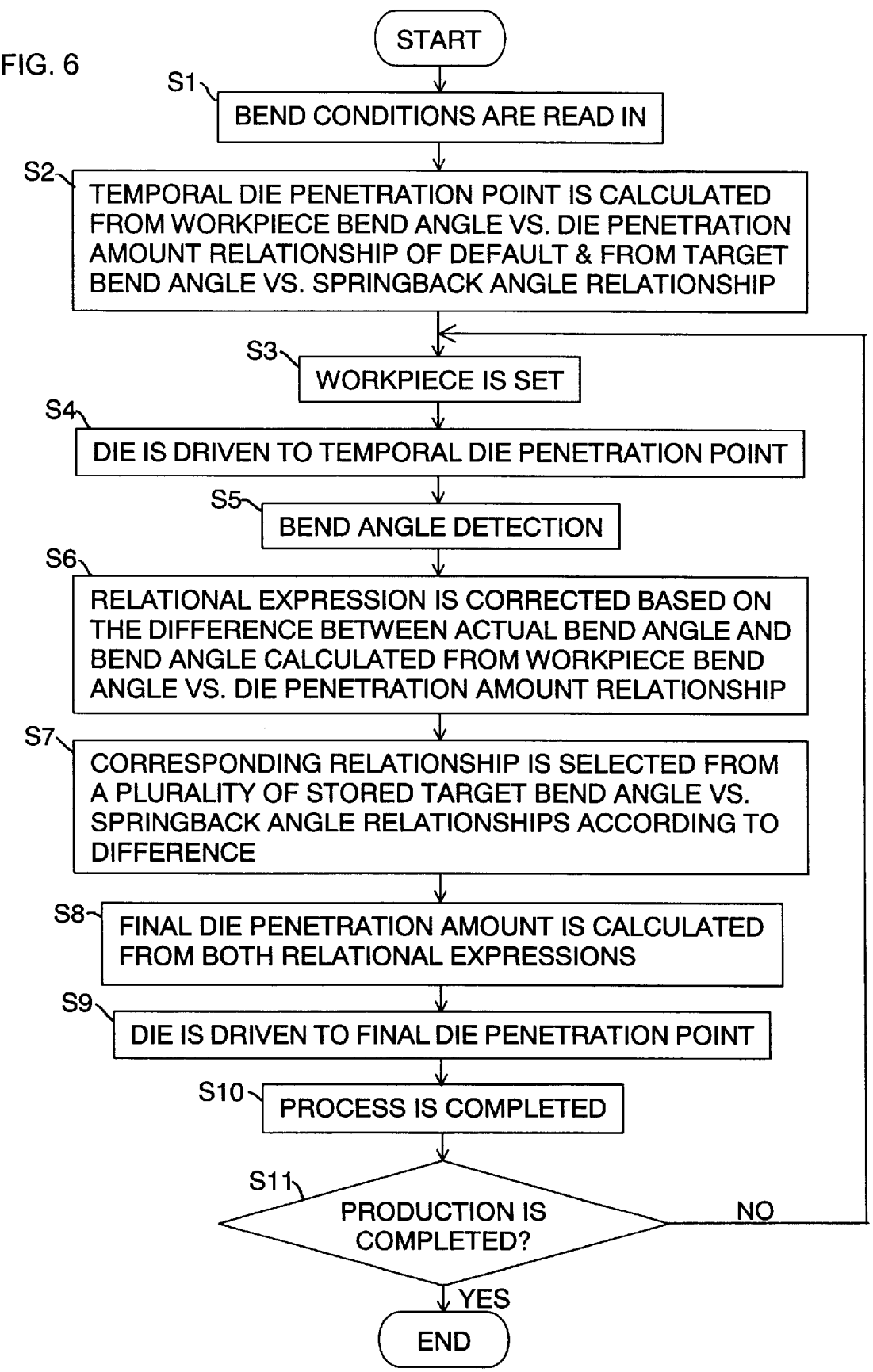
FIG. 6 is a flowchart diagram showing a die (punch) penetration amount control flow.
Figure 7:
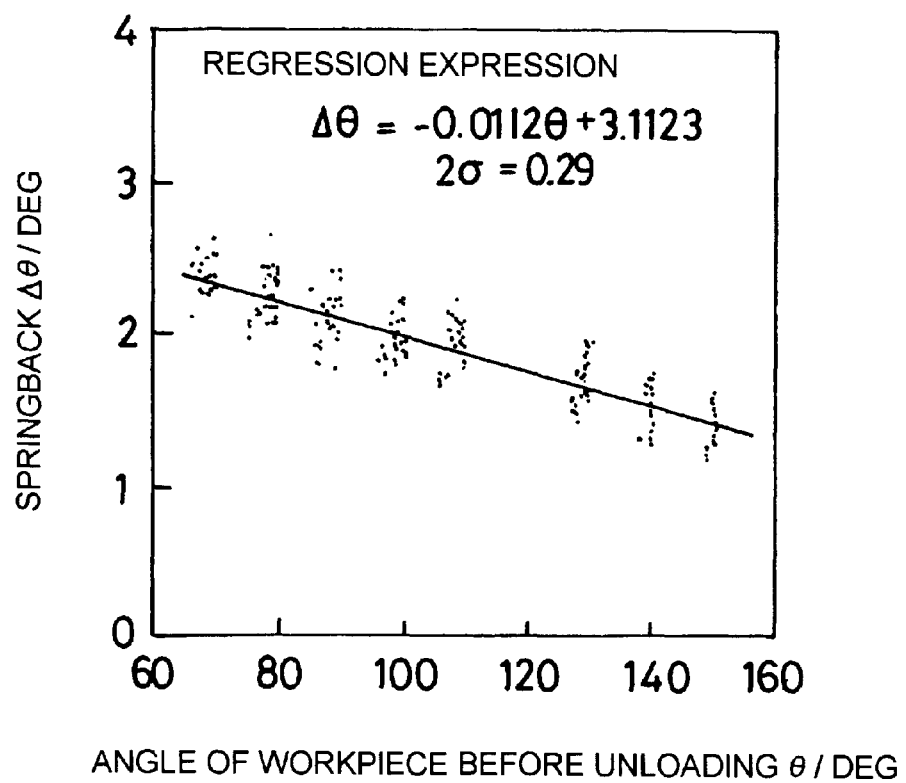
FIG. 7 graphically shows a workpiece angle versus springback angle relationship.

Referring now to the flow chart diagram of FIG. 6, a die penetration amount control flow on the basis of the above-described knowledge will be explained step by step.

S1: Bend conditions (such as material, sheet thickness, bend shape, die shape and machine information) for the workpiece W, that have been input to the storage means 12 for storage therein, are read in.

S2: A relational expression for a default (an initial value held in the NC device) is selected based on the relationship between a bend angle of the workpiece W and a die penetration amount as well as on the relationship between a target bend angle of the workpiece W and a springback angle, to arithmetically calculate a temporal die penetration point when the upper and lower dies are made to approach to each other. In other words, an angle detection point is arithmetically calculated. Preferably, the temporal die penetration point is located as close to the target bend angle as possible but within the range that the workpiece W is not overbent.

S3 to S5: The workpiece W is set by the operator and a bending operation starts. The upper die 5 is moved towards the lower die 3. When the upper die 5 arrives at the temporal driving position, the angle detector 7 detects an actual bend angle of the workpiece W.

S6: Based on the difference between the actual bend angle of the workpiece W detected at the temporal die penetration point and a workpiece estimated bend angle arithmetically calculated from a bend angle versus die penetration amount relationship of the workpiece W stored in the storage means 12, the arithmetic unit 13 makes a correction on that relationship.

S7: On the basis of the difference between the actual bend angle and the estimated bend angle, a corresponding relationship is selected from among the target bend angle versus springback angle relationships in the storage means 12.

In the present embodiment, the selection of such a corresponding relationship is made as follows. In the left graph of FIG. 2 showing a bend angle versus die penetration amount relationship, an in-plane area (which is defined by a bend angle and a die penetration amount) is divided into a plurality of sub-areas (e.g., areas A, B and C). The sub-areas A to C correspond, respectively, to the relational expressions for workpiece bend angle versus springback angle relationships and these expressions are shown in the right graph of FIG. 2 by straight lines in the present embodiment. For instance, if in the left graph of FIG. 2, data a relating to the detected actual bend angle is located in the sub-area C with respect to data b relating to the estimated bend angle (i.e. data in a default relationship), then a corresponding curve C (a straight line in the present invention) of the right graph of FIG. 2 to the sub-area C is selected.

S8 to S9: A final die penetration point is arithmetically calculated from the corrected workpiece bend angle versus die penetration amount relationship as well as from the selected workpiece target bend angle versus springback angle relationship. Then, the upper die 5 is driven up to the final die penetration point.

S10 to S11: The bending process is over. If the production is to be continued, then the program returns to the step S3 and the foregoing processing steps are repeated. If the production is to be completed, the flow is terminated.

The processes shown in the flow may be performed for every bending operation. Alternatively, the operator may direct that a correction operation is performed at any stages such as when changing a material lot.

In the present embodiment, a particular region is selected from a plurality of regions, according to the difference between an actual bend angle and an estimated bend angle, and an expression representative of a workpiece bend angle versus springback angle relationship corresponding to the selected region is selected. Alternatively, it is possible to use an expression obtained by parallel transition of an expression representative of a workpiece bend angle versus springback angle by a predetermined amount according to the difference between an actual bend angle and an estimated bend angle.

The present embodiment employs, as angle detecting means, an angle detector comprising a light source for projecting rays of slit light and a CCD camera for taking the picture of a linear light-projected image. Instead of using such a type of angle detector, various other types of angle detectors may be used, such as capacitance type angle detectors, electrooptic type angle detectors, and contact type angle detectors.

The present embodiment has been described in terms of so-called overdrive type press breaks in which an upper die (punch) is driven, with a lower die fixed. The present invention can be applied to so-called underdrive type press breaks in which a lower die is driven, with an upper die fixed.

We claim:

1. A bending method for bending a sheet-like workpiece between a movable die and a fixed die by pressing, said bending method comprising the steps of:

(a) finding, based upon the difference between an actual bend angle of said workpiece detected a temporal penetration point of said movable die during a process of bending said workpiece and an estimated bend angle of said workpiece at an arbitrary penetration point of said movable die, a correction value for data relating to a springback behavior under a prestored processing condition for said bending process, and (b) obtaining, based on said correction value, a final penetration point of said movable die, wherein a plurality of relational expressions for workpiece bend angle versus a springback angle are provided to compensate for springback angle variation resulting from variations in material properties of said workpiece for each type of processing condition, wherein said processing condition includes any one of a group including material, thickness, bend shape, die shape, and machine information.

2. A bending apparatus for bending a sheet-like workpiece between a movable die and a fixed die by pressing, said bending apparatus further comprising:

(a) storage means for storing, for each processing condition of said workpiece, both a relationship existing between the bend angle of said workpiece and the penetration amount of said movable die and a relationship existing between the bend angle of said workpiece and the springback angle of said workpiece, (b) angle detecting means for detecting a bend angle produced in said workpiece during a process of bending said workpiece, (c) arithmetic means for arithmetically finding a final penetration point of said movable die from an actual bend angle of said workpiece detected by said angle detecting means at a temporal penetration point of said movable die as well as from an estimated bend angle of said workpiece arithmetically derived from said workpiece bend angle versus movable die penetration amount relationship stored in said storage means, and (d) die driving means for driving said movable die to said final penetration point after driving it to said temporal penetration point, wherein a plurality of relational expressions for workpiece bend angle versus a springback angle are provided to compensate for springback angle variation resulting from variations in material properties of said workpiece for said each type of processing condition, wherein said each processing condition includes any one of a group including material, thickness, bend shape, die shape, and machine information.

3. A bending apparatus according to claim 2, wherein said temporal penetration point is arithmetically calculated from said workpiece bend angle verses movable die penetration amount relationship and said workpiece bend angle verses springback angle relationship stored in said storage means.

4. A bending apparatus according to claim 2 or claim 3, wherein said arithmetic means performs, based on the difference between said workpiece actual bend angle and said workpiece estimated bend angle, a correctional arithmetic operation for making a correction on said workpiece bend angle verses springback angle relationship to find a correction amount and arithmetically calculates said final penetration point of said movable die on the basis of said correction amount.

5. A bending apparatus according to claim 4, wherein said correctional arithmetic operation is performed by selecting a workpiece bend angle verses movable die penetration amount relationship as a particular one of a plurality of regions within a plane defined by the workpiece bend angle and movable die penetration amount of said relationship and by selecting an expression representative of a workpiece bend angle verses springback angle relationship corresponding to said selected region.

* * * * *